(12) United States Patent
Nappe

(10) Patent No.: US 11,179,612 B2
(45) Date of Patent: Nov. 23, 2021

(54) APPARATUS AND SYSTEM FOR SUPPORTING A GOLF CLUB

(71) Applicant: Christopher Nappe, Riverhead, NY (US)

(72) Inventor: Christopher Nappe, Riverhead, NY (US)

(*) Notice: Subject to any disclaimer, the term of this patent is extended or adjusted under 35 U.S.C. 154(b) by 0 days.

(21) Appl. No.: 16/986,695

(22) Filed: Aug. 6, 2020

(65) Prior Publication Data
US 2021/0038956 A1 Feb. 11, 2021

Related U.S. Application Data

(60) Provisional application No. 62/883,280, filed on Aug. 6, 2019.

(51) Int. Cl.
| | |
|---|---|
| A63B 55/10 | (2006.01) |
| A63B 57/30 | (2015.01) |
| F16M 13/06 | (2006.01) |
| A63B 57/35 | (2015.01) |

(52) U.S. Cl.
CPC .............. *A63B 55/10* (2013.01); *A63B 57/35* (2015.10); *A63B 57/353* (2015.10); *F16M 13/06* (2013.01); *A63B 2210/50* (2013.01)

(58) Field of Classification Search
CPC ....... A63B 55/10; A63B 57/353; A63B 57/35; A63B 2210/50; F16M 13/06; F16M 11/041; F16M 11/10; F16M 11/26
See application file for complete search history.

(56) References Cited

U.S. PATENT DOCUMENTS

| | | | | |
|---|---|---|---|---|
| 1,408,876 A | * | 3/1922 | Frey .................... | A63B 55/10 206/315.3 |
| 1,621,329 A | * | 3/1927 | Malone ................. | A63B 55/10 211/70.2 |
| 4,671,478 A | * | 6/1987 | Schoenig ............. | F16B 7/0413 16/19 |
| 4,697,772 A | * | 10/1987 | Kosugi ................ | F16M 11/105 248/183.3 |
| 5,230,507 A | * | 7/1993 | White .................. | A63B 55/10 206/315.3 |
| 5,413,329 A | * | 5/1995 | Hirsch ................. | A63B 55/10 211/70.2 |
| 5,482,247 A | * | 1/1996 | Smith .................. | A63B 69/3685 248/688 |
| 5,492,230 A | * | 2/1996 | Horton ................ | A63B 55/10 211/196 |
| 5,730,404 A | * | 3/1998 | Evans .................. | A63B 55/10 248/156 |
| 5,782,704 A | * | 7/1998 | Tetler .................. | A63B 55/10 211/70.2 |
| 5,813,414 A | * | 9/1998 | Zutler .................. | A63B 57/50 131/241 |

(Continued)

*Primary Examiner* — Stephen L Blau
(74) *Attorney, Agent, or Firm* — GrayRobinson, P.A.; Michael J. Colitz, III

(57) ABSTRACT

Disclosed is a device for supporting a golf club. The device includes two telescoping legs that are attached to a body. A c-shaped clamp is formed as part of the housing and is dimensioned to be clipped onto the shaft of a golf club. With the telescoping legs extended, the legs and golf club head form a tripod. This arrangement allows the club to be supported in an upright position on the golf course and prevent the golf grip from getting dirty or wet.

7 Claims, 4 Drawing Sheets

(56) References Cited

U.S. PATENT DOCUMENTS

| | | | |
|---|---|---|---|
| 6,428,422 B1 | 8/2002 | Bennett | |
| 6,748,873 B2 * | 6/2004 | Brown, Sr. | A47B 3/10 |
| | | | 108/49 |
| 6,955,609 B1 * | 10/2005 | Hiltner, Jr. | A63B 55/10 |
| | | | 473/176 |
| 7,073,926 B1 * | 7/2006 | Kremers | F16M 11/10 |
| | | | 248/123.2 |
| 7,189,166 B2 * | 3/2007 | Pare | A63B 55/10 |
| | | | 473/282 |
| 7,403,277 B2 * | 7/2008 | Goodjohn | G01B 5/0023 |
| | | | 356/139.04 |
| 7,677,989 B2 * | 3/2010 | Fletcher | A63B 55/10 |
| | | | 473/282 |
| 7,771,287 B2 * | 8/2010 | Staszak | A63B 55/10 |
| | | | 473/282 |
| 7,841,951 B1 | 11/2010 | Schiltz | |
| 8,066,119 B2 * | 11/2011 | Doman | A63B 55/408 |
| | | | 206/315.2 |
| 8,801,548 B2 * | 8/2014 | Swingle | A63B 69/38 |
| | | | 473/462 |
| D735,829 S * | 8/2015 | Bagshot | D21/796 |
| 9,675,146 B1 * | 6/2017 | Howell | F16M 11/041 |
| 9,707,464 B2 | 7/2017 | Vickers | |
| 9,908,020 B1 | 3/2018 | Simmons et al. | |
| 9,931,553 B1 | 4/2018 | Ware | |
| 10,046,894 B1 * | 8/2018 | Carter | F24H 3/0423 |
| 2004/0198527 A1 * | 10/2004 | Hsieh | A63B 55/10 |
| | | | 473/282 |
| 2005/0011999 A1 * | 1/2005 | Smart | F16M 11/245 |
| | | | 248/170 |
| 2007/0093311 A1 * | 4/2007 | Fletcher | A63B 55/10 |
| | | | 473/282 |
| 2007/0149303 A1 * | 6/2007 | Miller | A63B 55/10 |
| | | | 473/282 |
| 2008/0135431 A1 * | 6/2008 | Tan | A63B 55/40 |
| | | | 206/315.7 |
| 2012/0056068 A1 * | 3/2012 | Maxwell | A63B 57/357 |
| | | | 248/533 |
| 2012/0115629 A1 | 5/2012 | McDowell et al. | |
| 2014/0031137 A1 * | 1/2014 | Basile | A63B 69/36213 |
| | | | 473/229 |
| 2014/0309053 A1 | 10/2014 | Masse | |
| 2017/0202321 A1 * | 7/2017 | Maurello | A45B 11/00 |
| 2020/0363008 A1 * | 11/2020 | Jankura | F16M 11/16 |
| 2020/0367619 A1 * | 11/2020 | Maurello | A63B 57/00 |
| 2020/0378415 A1 * | 12/2020 | Dammermann | F16M 11/08 |
| 2021/0068509 A9 * | 3/2021 | Maurello | A63B 57/00 |

* cited by examiner

APPARATUS AND SYSTEM FOR SUPPORTING A GOLF CLUB

CROSS REFERENCE TO RELATED APPLICATIONS

This application claims priority to, and is a continuation of, Application Ser. No. 62/883,280 filed on Aug. 6, 2019 and entitled "Device for Supporting a Golf Club. The contents of this application are fully incorporated herein for all purposes.

BACKGROUND OF THE INVENTION

Field of the Invention

The present disclosure relates to an apparatus and system for supporting a golf club upon the ground. More particularly, the present disclosure relates to an apparatus that supports the grip of a golf club when the golf club is placed upon the ground.

Description of the Background Art

Golf is a game that is widely popular in the United States and abroad. This popularity has only increased in recent years. Golf is known for the intricacy of both its rules and etiquette. For example, USGA Rule 4, limits the number of clubs that can be used in a round as well as the conditions under which a club can be repaired during a round. Golf etiquette also places an emphasis on the speed of play. A player's golf bag, containing a variety of different clubs, is often transported around a course on the back of a golf cart. During a round, players will leave the cart and walk to the location of their ball. This is done to expedite play as the occupants of the golf cart will invariably be playing shots from different locations on the fairway. This means that the correct club must be selected without the benefit of the player being at the location of their ball. This is often difficult to do from the vantage point of the cart, as a player knows neither the exact yardage to the hole nor the lie of the ball. As a result, before leaving the cart, players often retrieve a number of clubs to ensure that they have the correct club for the shot.

Once at the ball, the correct club is selected, and the unused clubs are cast to the ground. These unused clubs remain on the ground until the conclusion of the shot. This phenomenon is especially true around the green, as golf carts are prohibited in these sensitive areas and the variety of clubs that may be needed is greater. In any event, the unused clubs are prone to getting wet, soiled, or muddy as they lie on the ground. The fertilizers used for fairways and greens may also degrade and otherwise prove detrimental to golf club grips. All of this adversely impacts subsequent shots. A golfer's only connection with the club is via the golf grip. Thus, grips that are wet, muddy, dirty, or degraded can result in mishits. Worse yet, it may prove dangerous to other golfers in the event the club slips out of the golfer's hand.

What is needed, therefore, is a small, transportable device that can support a club and its grip above a fairway or green. The apparatus described herein aims to overcome these and other shortcomings known in the golfing arts.

SUMMARY OF THE INVENTION

It is therefore an object of the disclosure to provide a device that can prop a club up while it is not in use.

It is another object of this disclosure to provide a golf caddy device that is collapsible and easily transportable.

Yet another object of the disclosure is to provide a golf club support device that can be clipped to the user's hat, pants, or other clothing so that it is always within reach.

A further object of the disclosure is to provide a golf club support apparatus that includes two legs, with the legs of the support forming a tripod with the club head.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

| Parts List |
| --- |
| 20 Apparatus |
| 22 Golf Club |
| 24 Golf Club Shaft |
| 26 Golf Club Grip |
| 28 Golf Club Head |
| 32 Clamp |
| 32(a) Edges of Clamp |
| 33 Arm |
| 33(a) Aperture in Arm |
| 34 Body |
| 34(a) and 34(b) Sections of Body |
| 34(c) Apertures in Body |
| 35 Bearing |
| 36 Legs |
| 36(a) Apertures in Legs |
| 38 Foot |
| 40 Screws |
| 44 Logo |
| 46 Ball Marker |
| 48 Upstanding Edges on Body |
| 50 Clip |
| 52 Clip Legs |
| 54 Hooks at Ends of Clip Legs |

DETAILED DESCRIPTION OF THE PREFERRED EMBODIMENT

The present disclosure relates to a system and apparatus for supporting a golf club. The apparatus includes two telescoping legs that are attached to a body. A clamp is pivotally attached to the housing and is dimensioned to be clipped onto the shaft of the club. With the telescoping legs extended, the legs and golf club head form a tripod. The angle between the shaft and the ground can be adjusted via the pivotal clamp. This arrangement allows the club to be supported at any of a number of different angles above the surface of a fairway or green. In this manner, the apparatus prevents the golf grip from getting muddy, dirty, or wet. The various components of the apparatus, and the manner in which they interrelate, are described in greater detail hereinafter.

Figure 1:
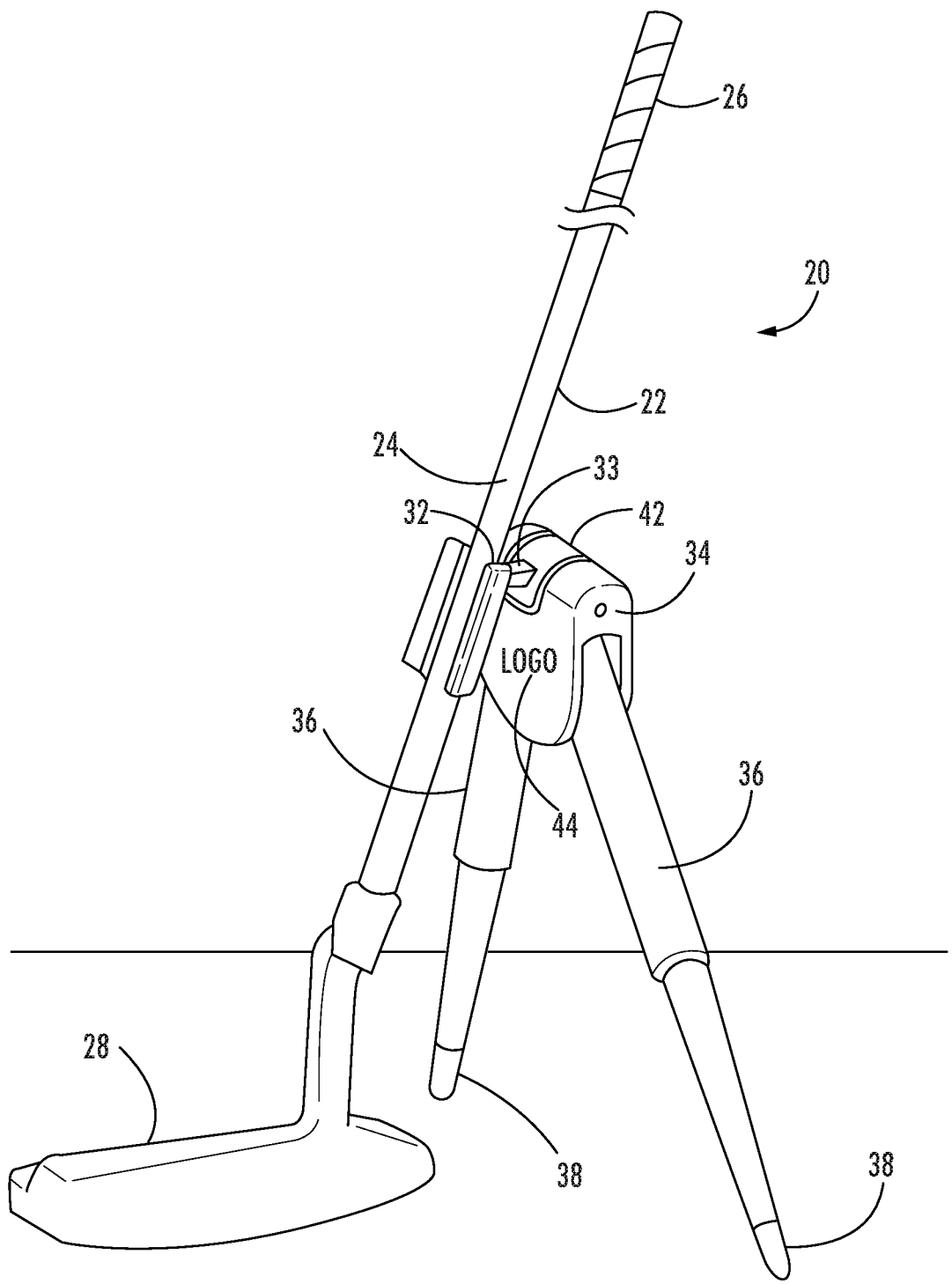
FIG. 1 is a perspective view of the apparatus for supporting a golf club.

FIG. 1 illustrates the apparatus 20 supporting a golf club 22 upon the ground. Club 22 is defined by a club shaft 24, grip 26, and club head 28. As illustrated, apparatus 20 and club head 28 form a tripod that supports grip 26 above the ground. Although FIG. 1 illustrates apparatus 20 supporting a putter, it can readily be used with any club, including irons and drivers. As illustrated, apparatus 20 is connected to the club 22 along the club shaft 24. The user is free to position apparatus 20 anywhere along the length of shaft 24.

Figure 4:
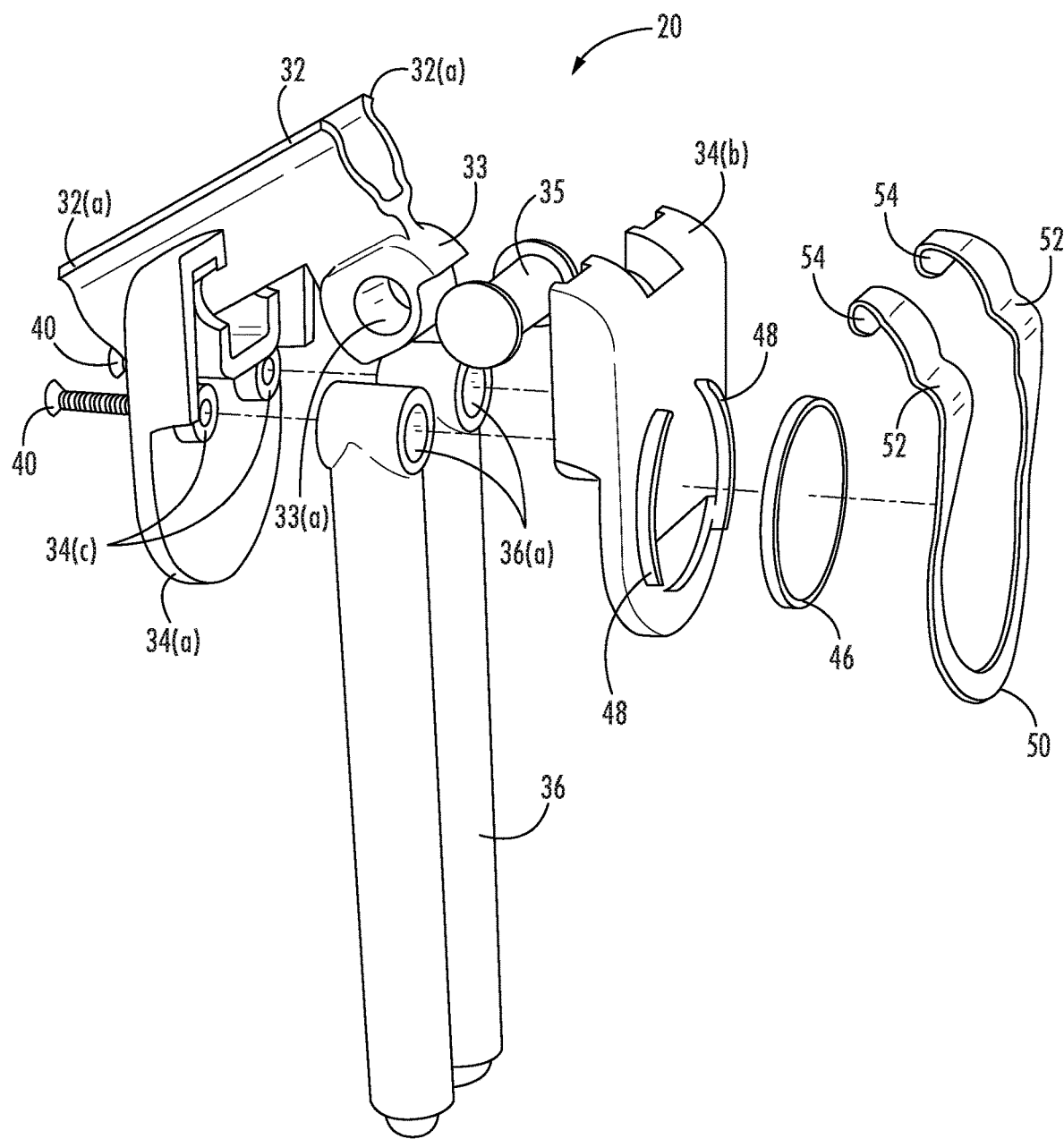
FIG. 4 is an exploded view of the apparatus.

To facilitate this attachment, apparatus 20 includes a generally C-shaped clamp 32 that is frictionally and releasably attached to shaft 24. Clamp 32 is ideally formed from a plastic material and is dimensioned to fit over a standard sized golf shaft. Clamp 32 is preferably formed from a plastic that has a sufficient degree of flex to permit it to flex slightly between opened and closed orientations and allows clamp 32 to be frictionally fitted about shaft 24. To further facilitate the positioning of clamp 32 about shaft 24, the edges 32a of clamp 32 can be flared outwardly (FIG. 4). In the preferred embodiment, the user would apply a minimal force to open the mouth of clamp 32 and allow it to engage about shaft 24. Thereafter, an equal force would be applied to remove clamp 32 from shaft 24. Clamp 32 can be positioned at any of a number of locations long shaft 24, with the location helping determine the angle at which club 22 is supported.

In the preferred embodiment, apparatus 20 includes a body 34 to which clamp 32 is pivotally connected. Body 34 is formed from two opposing halves (34a and 34b) that are secured together via retaining screws 40. The first half of body 34(a) includes apertures 34(c) for receiving screws. The opposing halves (34a and 34b) define an internal area. Clamp 34 includes an arm 33 that is pivotally secured within this internal area. More specifically, a bearing is pivotally positioned within the internal area and is secured within an aperture 33(a) within arm 33. This allows the clamp 33 to pivot about the bearing 35. Bearing 35 can be made of metal to avoid wear or damage. The remainder of apparatus 20 can be form from an impact resistant plastic or metal. This, in turn, allows clamp 32 to be selectively moved between a number of different angular positions.

For example, clamp 32 can be pivotally oriented to the side of body 34 such that the mouth of clamp 34 is generally perpendicular to the ground. In this orientation, apparatus 20 supports club 22 in a more or less vertical arrangement. Alternatively, clamp 32 can be pivoted so that it is oriented over the top of the body 34 such that the mouth of clamp 34 is generally parallel to the ground. In this orientation, and with clamp 34 secured further up on the club shaft 24, the angle between the ground and club 22 is minimized. Thus, a wide variety of club orientations can be achieved by adjusting the angle of clamp 32 and its position along the club shaft 24.

Two telescoping legs 36 are also pivotally connected to body 34. Although two legs 36 are illustrated, it is within the scope of the present disclosure to use three or more legs 36.

Figure 2:
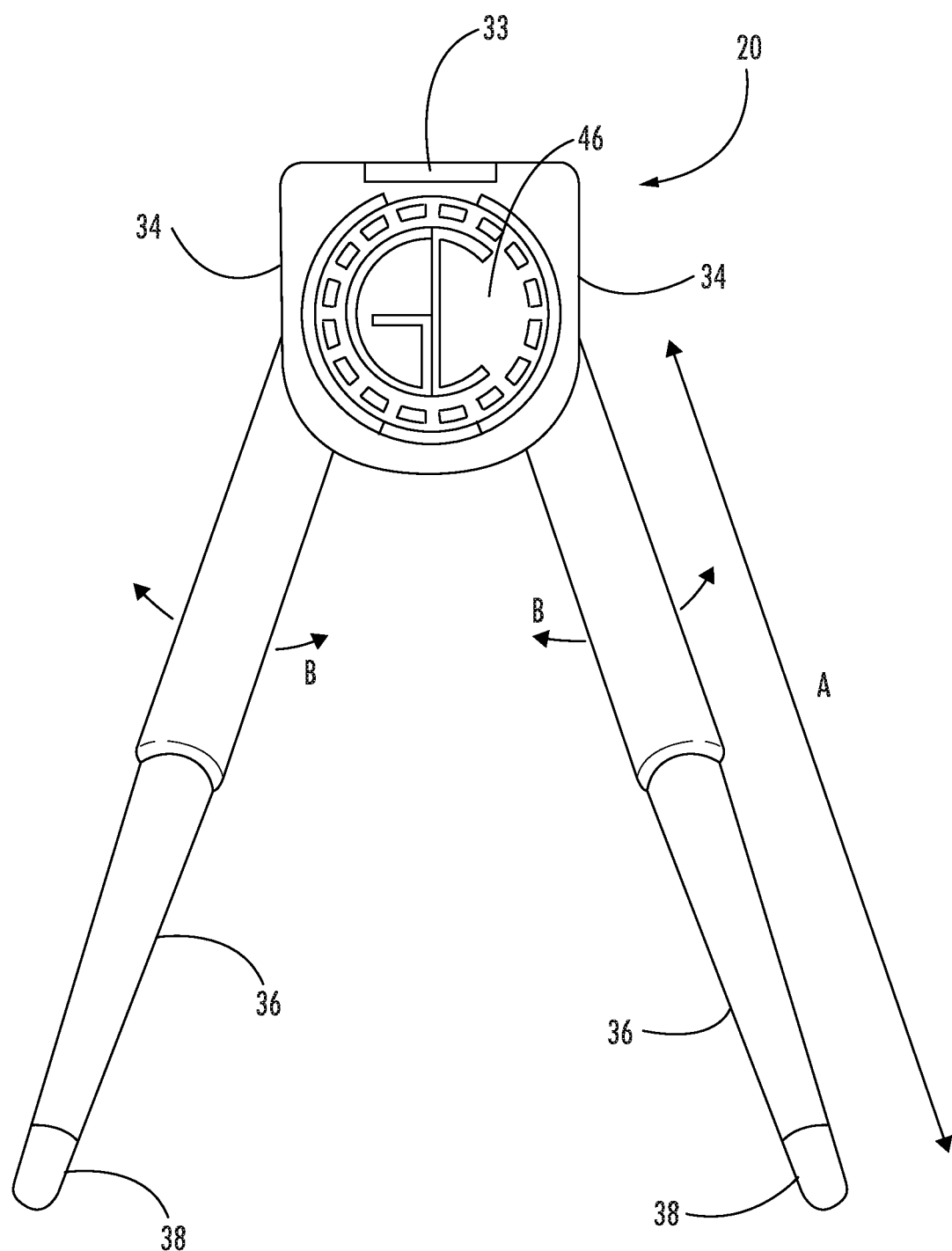
FIG. 2 is a front elevational view of the apparatus for supporting a golf club.
Figure 3:
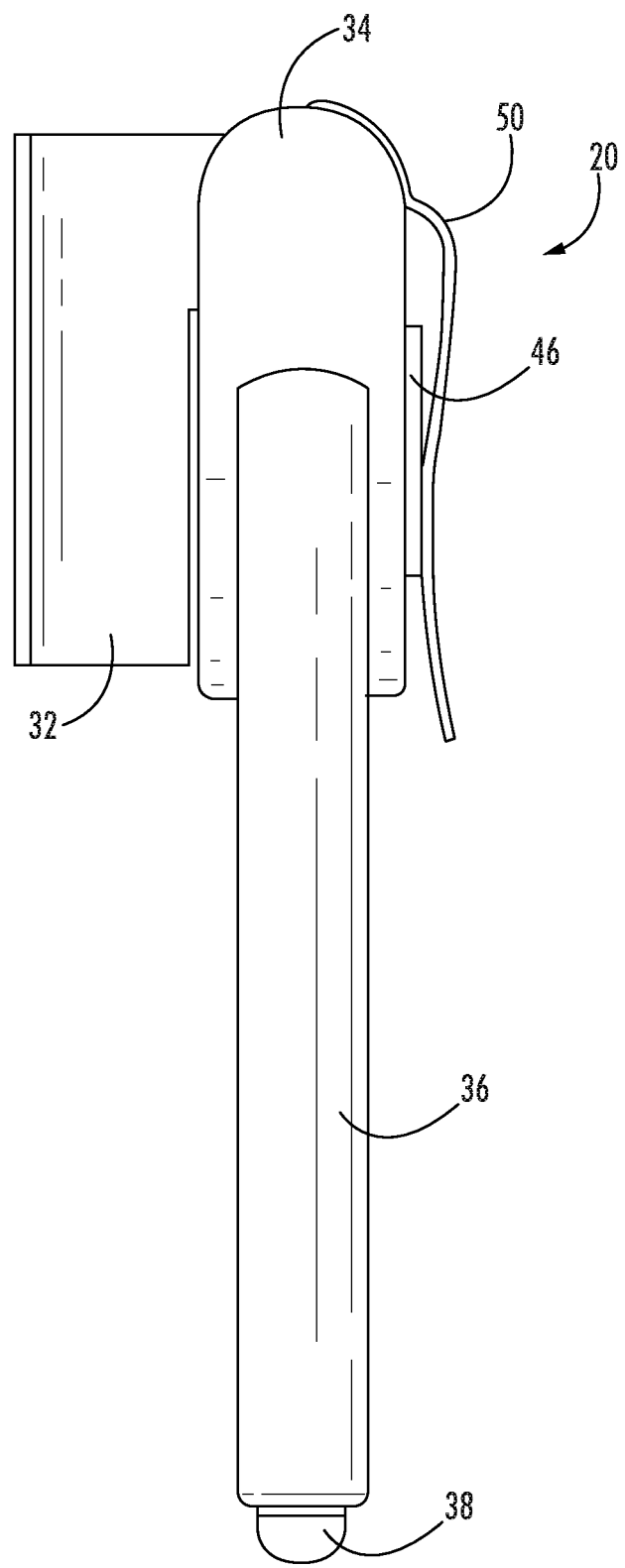
FIG. 3 is a side elevational view of the apparatus for supporting a golf club.

In the depicted embodiment, each leg 36 includes two telescoping sections. More specifically, each leg 36 is formed from a larger tubular section (that is pivotally connected to body 34) and that receives a smaller tubular section. More specifically, the upper extent of each leg 36 terminates in an aperture 36(a). These apertures 36(a) are positioned within the internal area of body 34 and receive the retaining screws 40. This arrangement allows the legs 36 to pivot with respect to body 34 in a first direction. This direction is noted by arrows "B" in FIG. 2. The pivotal attachment between legs 36 and body 34 allows legs 36 to pivot toward or away from each other as shown by arrows "B." This effectively allows the angle at which legs 36 diverge to be modified. The pivotal direction "B" is generally perpendicular to the pivotal movement of clamp 32. Each leg 36 terminates in a foot 38 that maybe rubberized and allows for the secure positioning of device 20 on the ground. However, different arrangements can be used for legs 36 as will be appreciated by those of ordinary skill in the art. As illustrated in FIG. 2, legs 36 telescope outwardly in the direction "A." Both the telescoping direction "A" and the pivoting direction "B" can be selected based upon the terrain upon which club 22 is to be supported. Apparatus 20 can be placed into its collapsed orientation by retracting the telescoping legs 36 as well as by pivoting legs 36 together.

With reference to the exploded view of FIG. 4, an optional clip 50 can be pivotally secured to body 34. Clip 50 preferably includes two opposing legs 52 that terminate in hooks 54. These hooks are received within the internal area of body 34. This results in clip 50 pivotally attached to body 34. This arrangement allows apparatus 20 to be removably fastened to, for example, the user's clothing. To achieve this, device 20 is first fully collapsed by both retracting and pivoting legs 36 together. Once collapsed, device 20 can be clipped to a belt or hat so that it can be easily accessed as needed. Logo 44 or other indicia can also be printed upon body 34 so that device 20 can be used as a promotional tool. FIG. 4 also illustrates a ball marker 46 that is magnetically secured to the side of body 34. In this regard, one side of body 34(b) can include upstanding edges 48 to create a slot for receiving marker 46. A recess can be created within body 34(b) to allow marker to be push into and pivoted out of slot. Apparatus 20 is an ideal location for ball marker 46 as apparatus 20 would be carried by the golfer to the putting green.

In use, apparatus 20 can be carried or worn by the golfer while it is in a collapsed orientation. Apparatus 20 can be carried to the location where the golfer is going to play his or her next shot. The golfer next affixes apparatus 20 to any club 22 that is not being played. This is accomplished by frictionally fitting club shaft 24 into the mouth of C-shaped clamp 32. To accomplish this, the mouth of clamp 32 may have to be opened slightly. The golfer can secure apparatus 20 at any location along the length of shaft 24. Next, legs 36 are extended outwardly and pivoted away from one another. In this orientation, club 22, with apparatus 20 attached, can be placed on the ground. As noted in FIG. 1, this allows a tripod to be formed between legs 36 and club head 28. In this tripod arrangement, the grip 25 of the club 22 does not contact the ground.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. An apparatus for supporting a golf club grip above the ground, the apparatus comprising:
 a body having first and second opposing faces, a magnetic ball marker being magnetically and releasably secured to the first face, indicia formed on the second face;
 a pair of telescoping legs, each leg including upper and a lower extents that are slidably interconnected, with the lower extent having extended and retracted orientations, a rubberized foot secured to each lower extent, the upper extent of each leg being pivotally connected to the body, such that the legs can be pivotally adjusted in a first direction, the apparatus having a collapsed orientation wherein the pair of legs are pivoted together and lower extents are retracted;
 a C-shaped clamp having a mouth with an opening, the mouth being biased between opened and closed positions, an arm pivotally connecting the C-shaped clamp to the body, the C-shaped clamp being pivotally adjusted in a second direction that is opposite of the first direction to adjust the angular position of the C-shaped clamp;
 a golf club with a shaft, the golf club grip being secured the shaft, the mouth of the C-shaped clamp being releasably secured about the shaft, whereby the pair of legs support the golf club grip above the ground.

2. An apparatus for supporting a golf club upon the ground, the apparatus comprising:
 a body having first and second opposing faces;
 a pair of legs, each leg including upper and a lower extents, the upper extent of each leg being pivotally connected to the body;
 a clamp being pivotally connected to the body;
 the golf club including a shaft, the shaft including a lower extent with a club head, the clamp being frictionally and releasably secured to the shaft such that the club head and lower extents of the legs are all in contact with the ground and form a tripod.

3. The apparatus as described in claim 2 further comprising a ball marker that is releasably secured to the body.

4. The apparatus as described in claim 3 wherein the ball marker is magnetically secured to the body.

5. The apparatus as described in claim 2 wherein the clamp includes an opening that can be frictionally fit about a golf club shaft.

6. The apparatus as described in claim 2 wherein the legs are telescopically adjustable.

7. A system for supporting golf equipment above the ground, the system comprising:
 a golf club (22), the golf club (22) including a shaft (24), a grip (26), and a club head (28);
 a prop (20) for the golf club (22), the prop (20) including:
  a body (34) including a first half (34a) and a second half (34b) that together define an interior space, the halves (34a and 34b) being coupled together via retaining screws (40), the second half (34b) including an outer face with upstanding edges (48), the upstanding edges (48) defining a slot;
  a pair of legs (36), each leg including a telescoping body with extended and retraced orientations, each leg (36) terminating in a rubberized foot (38), each leg (36) further including an aperture (36a) at an upper extent, each aperture (36a) being pivotally connected within the interior space via the retaining screws (40) and permitting the legs (36) to pivot with respect to the body (34) in a first direction;
  a clamp (32) including an arm (33), the clamp (32) including opposed and outwardly extending edges (32a), the arm (33) including an aperture (33a), a bearing (35) positioned within the interior space, the aperture (33a) receiving the bearing (35) and permitting the clamp (32) to pivot with respect to the body (34) in a second direction, the second direction being substantially perpendicular to the first direction;
  a magnetic ball marker (46) being magnetically and releasably secured to the slot of the outer face, a clip (50) including two opposing legs (52), with each leg (52) terminating in a hook (54), the hooks (54) being retained within the interior space of the body (34) to permit the clip (50) to pivot with respect to the housing (34);
 the shaft (24) of the golf club (22) being releasably retained within the clamp (32) with the legs (36) extended such that the feet (38) and club head (28) are in contact with the ground and form a tripod that supports the golf club (22).

* * * * *